April 12, 1932. D. J. STEWART ET AL 1,853,325
TEMPERATURE REGULATING APPARATUS
Filed May 10, 1929 2 Sheets-Sheet 1
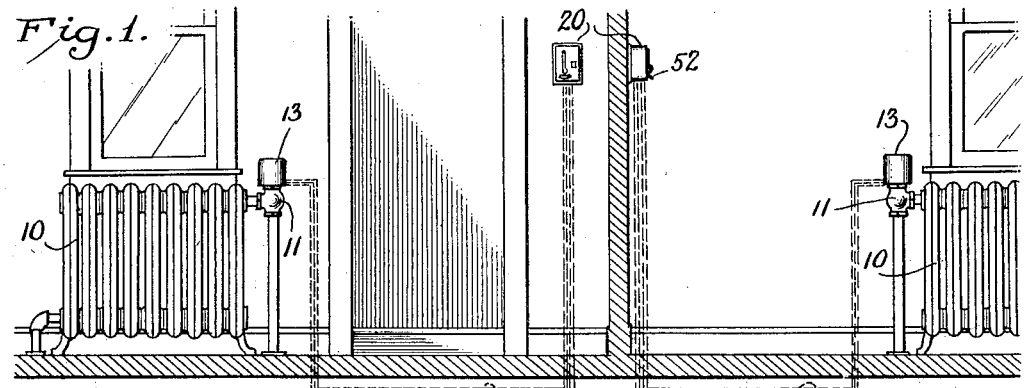
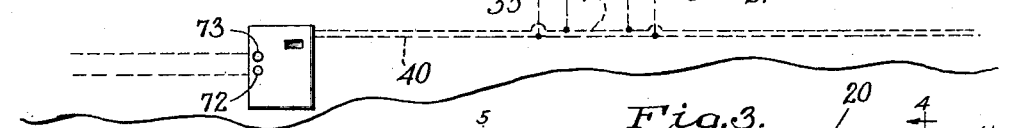
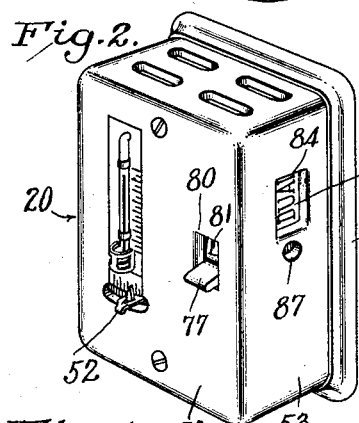
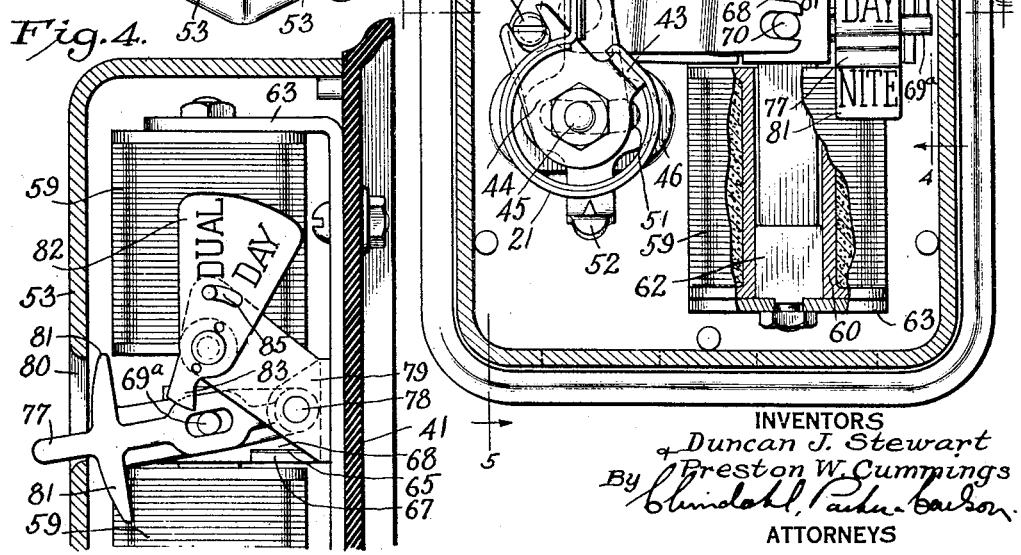
INVENTORS
Duncan J. Stewart
Preston W. Cummings
By
ATTORNEYS

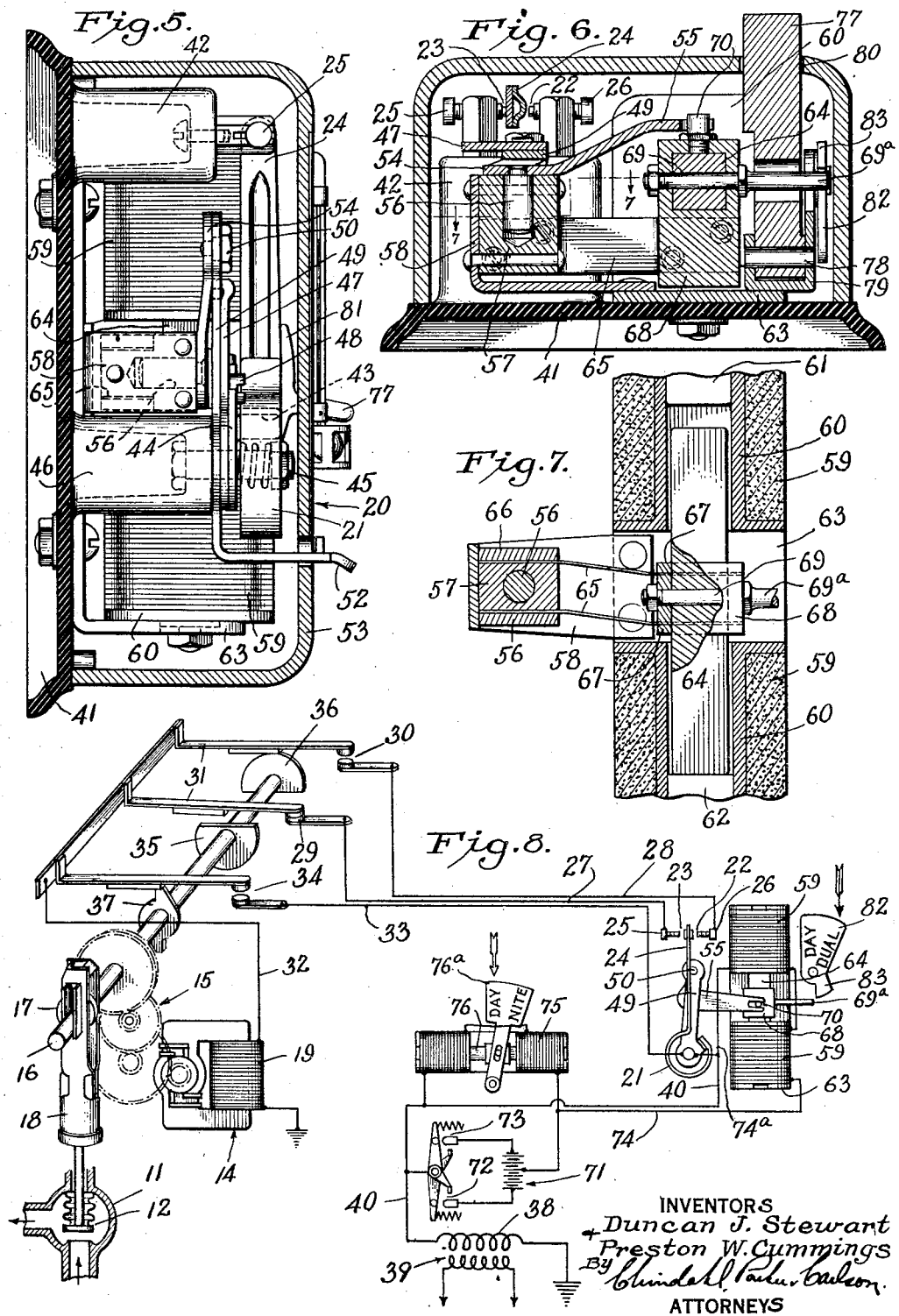

Patented Apr. 12, 1932

1,853,325

UNITED STATES PATENT OFFICE

DUNCAN J. STEWART AND PRESTON W. CUMMINGS, OF ROCKFORD, ILLINOIS, ASSIGNORS TO HOWARD D. COLMAN, OF ROCKFORD, ILLINOIS

TEMPERATURE REGULATING APPARATUS

Application filed May 10, 1929. Serial No. 362,096.

This invention relates to improvements in temperature regulating apparatus and more particularly to a so-called dual control system, operable from a central point of remote control to regulate air heating apparatus so as to maintain a predetermined temperature during the day, when the rooms heated by the system are occupied, and a somewhat lower temperature during that part of the night when the rooms are usually unoccupied.

The primary object of the invention is to provide an adjustable thermostat for dual control heat regulating systems having incorporated therein a new and improved actuator which insures accuracy and reliability in the operation and setting of the thermostat and which is capable of being controlled electrically from a central point of control to change the temperature to which the thermostat is set to respond.

A further object is to provide a novel means for retaining the different settings of a dual control thermostat.

Another object is to provide a novel electromagnetic actuating mechanism for effectually controlling the setting of a dual thermostat under all of the abnormal conditions which may be encountered in the operation of dual control heat regulating systems.

A further object is to provide a novel arrangement of electric circuits for controlling the electromagnetic operators and thermostats for the heating units in a dual control system.

Other objects and advantages of the invention will become apparent from the following detailed description taken in connection with the accompanying drawings, in which:

Figure 1 is a fragmentary view of two rooms of a building equipped with a dual control heat regulating system embodying the features of the present invention.

Fig. 2 is a perspective view of one individual room thermostat unit.

Fig. 3 is an elevational view of the operating parts of the thermostat unit shown in Fig. 2, the casing being shown in section.

Figs. 4, 5 and 6 are sectional views taken respectively along the line 4—4, 5—5 and 6—6 of Fig. 3.

Fig. 7 is a fragmentary sectional view taken along the line 7—7 of Fig. 6.

Fig. 8 is a wiring diagram and schematic view of the various parts of the dual control system.

While the invention is susceptible of various modifications and alternative constructions, we have shown in the drawings and will herein describe in detail the preferred embodiment, but it is to be understood that we do not thereby intend to limit the invention to the specific form disclosed, but intend to cover all modifications and alternative constructions falling within the spirit and scope of the invention as expressed in the appended claims.

In the exemplary form shown in the drawings, the invention is illustrated in connection with a heating system for a building employing one or more radiators 10 to heat each room. The regulation of heat supplied to the individual rooms may be effected by any suitable or preferred means. It is accomplished in the present embodiment by an electrically actuated control valve for each radiator 10, each valve having its casing 11 interposed in the passageway leading to the radiator and a member 12 (Fig. 8) movable axially toward and from its seat to close and open said passageway.

To open or close the valve in accordance with the heat requirements of the surrounding air, the power operator is associated with the valve member and its operation is controlled by an individual thermostat. In the present instance, the operator is supported directly on the valve casing within on enclosing cap 13, and includes an electric motor 14 which, through the medium of speed reducing gears 15, drives a shaft 16 carrying an actuating cam 17. This cam acts on a follower 18 to seat or unseat the valve member in alternate half revolutions of the shaft 16. The motor herein shown is of the single-phase induction type having a winding 19 adapted to be energized from a source of alternating current.

Each thermostat 20 (Figs. 1 and 2) includes a thermo-sensitive element such as a bi-metallic circular strip 21 for selectively closing switches 22 and 23 formed by a tongue 24 on the strip and two relatively stationary contacts 25 and 26. These switches are interposed in separate parallel circuits (Fig. 8) leading through the motor winding 19 and act to control the starting of the motor in alternate valve opening and closing cycles. For this purpose, the contacts 25 and 26 are connected by conductors 27 and 28 to the relatively stationary contacts of switches 29 and 30 incorporated in the motor unit and normally tending to close by reason of the resiliency of the strips 31 on which the movable contacts of these switches are mounted. The latter contacts are made electrically common and are connected by a conductor 32 to one end of the winding 19 which is grounded at its other end to the piping of the heating system. The thermostat tongue is connected by a conductor 33 to one terminal of a switch 34 also common to the conductor 32.

The switch 29, which cooperates with the thermostat switch 23 to control the valve-closing cycle, is allowed to close by a cam 35 prior to the completion (see Fig. 8) of the valve-opening cycle of the motor operator, and is opened during the valve closing cycle after the running circuit through a switch 34 has taken control of the motor. A similar cam 36 controls the switch 30 which governs the valve-opening cycle. The switch 34 is allowed to close by a cam 37 shortly after the initiation of each valve operating cycle and is opened to terminate the cycle when the valve member 12 reaches open or closed position.

Alternating current from a source such as the secondary 38 of a transformer 39 is supplied to the motor through a conductor 40 connected to the common terminal of the thermostat switches, that is, the tongue 24, so as to be electrically common to the two starting circuits controlled by the thermostat and also to the running circuit of the motor which is controlled by the switch 34. Thus, the power conductor 40 may be extended directly to a terminal on the thermostat. The other terminal of the secondary 38 is grounded to the piping of the system.

Referring now to the construction of each thermostat which permits of dual adjustment from the central point of control, the thermostat strip 21 is mounted on a rectangular base 41 of insulating material, with the tongue 24 extending longitudinally of the base adjacent one side edge thereof. Preferably the contacts 25 and 26 cooperating with the tongue are mounted at one upper corner of the base on a pedestal 42 projecting forwardly therefrom. In accordance with present practice, the thermostatic strip is made substantially circular in form, one end being secured to and supporting the tongue 24. The other end is secured to a lug 43 on a plate 44 constituting a lever which is pivoted on a stud 45 supported by a pedestal 46 beneath the pedestal 42. A second lever in the form of a plate 47 is also fulcrumed on the stud 45 and is connected to the plate 44 through the medium of an eccentric screw 48 by which the angular relation of the two levers may be varied in the initial setting of the thermostat.

At its upper end, the lever 47 has an inturned lug projecting into a third lever 49 closely adjacent the fulcrum of the latter which is herein formed by a shouldered stud 50. The third lever projects downwardly below the strip 21 and is slotted as is indicated at 51 (Fig. 3) to allow for lateral movement of its lower end and this end is bent outwardly forming an arm 52 so as to extend through a slot in a box-like enclosing casing 53 mounted on the base. By swinging the lever 49 through the medium of the arm 52, the levers 44 and 47 are swung slightly about their common fulcrum 45 thereby changing the relation of the tongue and the contacts. Thus with the fulcrumed stud 50 in any fixed position the setting of the thermostat may be varied as desired by actuation of the arm 52 from a point outside of the casing, the degree of such change being measured along a scale marked on the external surface of the thermostat casing.

For the sake of simplicity in construction, the same thermo-sensitive element and cooperating contacts are used for the maintenance of both "day" and "night" temperatures and the transfer of a plurality of thermostats from one control to the other is effected simultaneously by changing the relation between the contacts and the mounting for the cooperating thermo-sensitive elements. This is accomplished, in the present instance, by shifting the fulcrum of the lever 49 laterally into either of two predetermined positions. For this purpose, the stud 50 is riveted onto the end of an arm 54 of a bell-crank mounted to swing about a horizontal pivot by vertical movement of its horizontal arm 55. Such pivotal mounting is provided by a stud 56 rigid with the bell crank and seated in a block 57 rigidly supported from the base 41 through the medium of a bracket 58.

Magnetic means is provided for shifting the bell crank and maintaining set positions thereof. Herein this means includes a pair of magnetic coils 59 wound on spools 60 which are mounted in axial alinement and in longitudinally spaced relation alongside of the thermostat tongue near the opposite side edge of the base 41. Projecting snugly into the remote ends of the spools 60 preferably about one-fourth of the coil lengths, are two pole pieces 61 and 62 of magnetic material bolted onto the forwardly extending arms of a yoke member or plate 63 which is made of magnetic material and securely fastened against the base 41. Thus the magnets are rigidly supported from the base with their opposed ends left open and thus adapted to receive an armature on which they exert a strong solenoid action in addition to an attractive and repelling force. The coils are, as shown, connected in series relation and are reversely wound on their respective spools so that the poles 61 and 62 will be of the same polarity when the coils are energized by the flow of direct current through them. That is, when the current flows in one direction, the pieces 61 and 62 will be north poles while south poles will be formed when the current flows in the opposite direction through the coils.

In the present instance, the armature is in the form of an elongated substantially straight bar 64 with its ends projecting into the ends of the solenoid coils and mounted for rectilinear reciprocation back and forth between the poles 61 and 62 which constitute stops for limiting the movement of the bar in opposite directions. The bar is shorter in length than the distance between the poles by an amount corresponding to the movement of the fulcrum 50 required to change the setting of the thermostat from "day" to "night" temperature or vice versa, it being noted that the change in the setting of the thermostat is proportioned to the movement of the bar 64. The difference between "day" and "night" is usually 20 degrees Fahrenheit.

The armature and the cooperating pole pieces may also be utilized as the means for maintaining the different settings of the thermostat while the coils are deenergized. To this end, the armature bar 64 is permanently magnetized and preferably is formed of cobalt steel which will retain such magnetism indefinitely provided that the magnetic field created by energization of the coils 59 is of relatively low intensity. Thus the bar 64 after being brought into contact with either of the pole pieces 61 or 62 attracts such pole pieces, the latter constituting an armature for the permanent magnet after the flow of current to the coils is cut off. Such attraction effectually maintains the set position of the fulcrum 50.

Intermediate its ends the bar 64 is mounted on a substantially frictionless support comprising a pair of readily flexible strips 65 of metal clamped by plates 66 (Figs. 5 and 7) on opposite sides of the block 57. The other ends of the strips project between the adjacent ends of the spools 60 and are secured by clamping plates 67 to the upper and lower sides of a block 68 through which the bar 64 extends and in which the bar is secured midway between the ends by a bolt 69. Connection between the armature and the bell crank arm 55 is completed (Fig. 3) by a stud 70 on the block 68, projecting into an end slot on the arm.

Preferably the block 68 is made of magnetic material and is supported, as shown in Fig. 6, with its rear surface positioned closely adjacent and substantially in contact with the face of the plate 63. Thus the air gap between the bar and the magnet core formed by the plate 63 is very narrow and remains unchanged throughout the range of reciprocatory movement of the armature bar which moves parallel to the plate 63. Two magnetic flux circuits are thus formed having a common portion formed by the block 68 which provides a magnetic flux path or connection of low reluctance between the yoke member 63 and the center of the bar 64. This relation is maintained throughout the range of movement of the bar which range may be made relatively large in the present actuator owing to the utilization of the coils 59 as solenoids.

It will be observed that when the bar 64 is engaging one or the other of the poles 61 and 62, a substantially closed magnetic circuit will be formed through the bar, the block 68, the plate 63, and the pole which is engaged by the bar. As a result of this arrangement, the flux threading this circuit and resulting from the permanent polarization of the bar will be increased substantially, thereby maintaining more effectually the position of the thermostat fulcrum 50. In addition, the provision of a substantially closed magnetic path between the armature bar and the pole pieces contributes to the increased power which the present magnetic actuator is capable of exerting upon energization of the magnets.

When the coils 59 are energized, the bar 64 is moved away from one pole piece and against the other by a combination of three forces. One of these is due to the resultant solenoid action which the coils exert on the bar 64. The second force is due to the repulsion between one end of the bar and the pole piece engaged thereby at the time the coils are energized, these poles being of same polarity. The third is an attraction between the other end of the bar and other pole which are of opposite polarity. Both of the latter forces result from the use of the bar 64 both as an armature for the coils and as a magnet, and the magnitude of the forces is greatly increased by the provision of the external shunt connection between the bar 64 and the pole pieces. Owing to the extremely efficient utilization of the available magnetic forces and the fact that the force exerted is substantially constant throughout a relatively wide range of movement of the bar, the size of the magnetic actuator and the current required for its energization may be reduced to a minimum. Because of the low magnetomotive force required there is no danger of deenergizing the permanent magnet bar 64.

The windings of the magnets for the different room thermostats are arranged to be energized simultaneously from a common source of direct current, such as a battery 71, by actuation of either of two normally open switches 72 and 73 located at the central point of control. Current of different polarities is rendered available, in the present instance, by connecting the respective switches 72 and 73 to opposite terminals of the battery, an intermediate terminal of the latter being connected by a conductor 74 to one coil 59 of each thermostat in the building.

With the present wiring arrangement for the valve operator wherein the power lead 40 extends to each thermostat instead of to the valve operator, this power line may be utilized conveniently as the return line for the dual control actuators of the different thermostats, thereby reducing to a minimum the amount of wiring required for installation of the present system. For this purpose the other terminal of the interconnected coils 59 is made electrically common to the conductor 40 as by means of a conductor 74ª disposed within the thermostat casings. The common terminal of the switches 72 and 73 is also connected to the conductor 40.

The normal operation of the system will now be explained, it being assumed that all of the room thermostats are set for "day" temperature, that is, with their bars 64 attracting the poles 62 (Fig. 3). While the thermostats are thus set, the "day" temperature maintained in the different rooms may be varied as desired by the occupants of such rooms, simply by moving the arm 52 to the proper scale indication. Such adjustment does not affect the dual control system except that the "night" temperature setting will be changed correspondingly. That is to say, there is a fixed relation between the "day" and "night" temperatures as determined by the relation between the length of the bar 64 and the distance between the poles 61 and 62, and this fixed relation is always maintained regardless of the "day" setting which is determined by the position of the arm 52. Let it further be assumed that the bar 64 of each thermostat is magnetized so that its upper and lower ends are north and south poles respectively and that energization of the coils 59 by closure of the switch 72 makes the pieces 61 and 62 south poles while the same pieces are made north poles when the switch 73 is closed.

Toward evening when it is desired to change the settings of the different thermostats for the maintenance of lower night temperatures, the switch 72 is closed momentarily thereby causing an energizing current to flow through all of the thermostat coils 59 in a direction to make the pole pieces 61 and 62 south poles. As a result a strong solenoidal action is exerted on the bar in a direction to move the bar away from the pole piece 62. Such energization produces a strong magnetic flux in the two magnetic circuits through the opposite ends of the bar and the common shunting block 68, this flux being greatly amplified as a result of the location of the shunting block close to the yoke member 63. In fact, the metallic circuit through the pole piece 62 is substantially closed and since the polarity of this piece resulting from energization of the coils is the same as that of the adjacent end of the bar 64, the latter will be repelled with considerable force, thereby adding to the force resulting from the solenoid action. The opposite end of the bar is attracted by the pole piece 61 whose polarity is of opposite character. The combined effect of these forces is to shift the bar toward the pole piece 61, the effective force remaining substantially constant throughout the range of movement since the decrease in the repelling action resulting from movement of the bar away from the pole 62 is balanced by an increase in the attractive force resulting from the approach of the bar toward the pole 61.

When the current is interrupted by allowing the switch 72 to open, the bar 64, due to magnetic attraction of the pole 61, will hold itself firmly against this pole inasmuch as there is practically no air gap in the magnetic circuit through the pole while there is a gap of considerable width between the bar and the other pole 62.

Such upward movement of the bar shifts the fulcrum 50 of the thermostat to the left as viewed in Fig. 3, with the result that the tongue contact is carried or the tongue is flexed in a direction to carry the contact toward the switch contact 23. In other words, the thermostat switches which control the valve opening cycles of the motor operators will be open so long as the temperature to which their thermostats respond remains above the night temperature predetermined by the change in the position of the fulcrum 50 when the bar 64 is engaging the pole piece 61. A lower room temperature is thus maintained during the night.

To restore all of the thermostats to the day setting, it is merely necessary to close the switch 73. This energizes the coils 59 of all of the thermostats making north poles of the pieces 61 and 62 which repel and attract the upper and lower ends respectively of the bar 64. These forces, together with the net solenoid action of the coils, move the bar downwardly against the pole piece 62 where it is held by the attractive force exerted by its north pole. Such movement of the bar shifts the thermostat tongue in a direction to close the switch 22, whereupon the operators for the different valves will execute opening cycles admitting heating fluid to the radiators.

Means located adjacent the control switches 72 and 73 in the basement or other remote point of control is provided to indicate at all times the condition of the system. Herein this means comprises a magnet with coils 75 arranged similar to the coils 59 of the thermostat actuators above described and acting when energized to shift a bar 76 which moves a lever 76ª, bearing "Day" and "Night" markings, to either of two positions relative to an indicating means. The coils 75 of the indicator are connected respectively to conductors 40 and 74.

Occasionally certain of the rooms controlled by the present system may be occupied at night, in which case the occupants of such rooms will desire to change their thermostats to the day setting. At the same time, it is desirable that the thermostat thus changed be non-responsive to the next manipulation of the switch 73 which normally effects the day setting of the thermostat, and yet responsive to a subsequent closing of the switch 72 by which the night setting is controlled. In other words, the thermostats in the rooms occupied infrequently at night should at all times remain subject to the normal dual control operations and should remain in step with each other in response to such operations. This is accomplished in the present instance by means which may be operated from the exterior of the thermostat casing 53, and which permits the bar 64 to be shifted away from the pole 61 into engagement with the pole 62. To this end, a lever 77 is fulcrumed at 78 on a bracket 79 with its end projecting forwardly through an opening 80 in the front wall of the casing 53 so that it may be grasped conveniently and shifted downwardly into the "day" position shown in Fig. 4. An extension 69ª of the bolt 69 (Fig. 6) projects through the lever 77 and thus connects it to the bar 64 so that the latter may be actuated by manipulation of the lever. The bar when thus moved against the pole piece 62 attracts the same and maintains the day setting of the thermostat.

Under the above conditions, it will be observed that the bar 64 will not be moved when the day setting of the other thermostats is restored by closure of the switch 73, because such energization causes the pole 62 to attract the bar 64. The bar will, however, respond to energization of its winding by closure of the switch 72 since such energization attracts the bar to the pole 61. Thus, later in the night, after all of the rooms become unoccupied, the thermostats which may have been set for day temperature by the occupants of the individual rooms may be changed back to the night setting by closure of the switch 73 which will not affect those thermostats already set for night temperature.

As a means for indicating at all times the condition of each thermostat, two lugs 81 are formed on opposite sides of the lever 77 and are marked with the words "Day" and "Night", which are exposed to view through the opening 80 when the bar 64 is in its lower and upper positions respectively. Since the lever is connected to the bar 64, it will be actuated when the bar is shifted by energization of the coils 59. Thus the lever 77 constitutes a means for indicating the condition of the thermostat as well as a means for enabling its setting to be changed manually.

Certain rooms of the building to which the present system is applied may be occupied regularly at night, and in such a case it is desirable that the controlling thermostats be non-responsive to dual control. For this purpose, a lever 82 pivoted on the bracket 79 is formed with a lug 83 which is disposed in the path of the projected end of the bolt 69 when the word "Day" is exposed through a window 84 in the side wall of the casing 53. This locks the bar 64 against upward movement. Normally, however, the lever 82 is retracted to the position shown in Fig. 4, thereby allowing the bar 64 to move upwardly either by manual operation of the lever 77 or by energization of the coils 59. Such position is indicated by exposure of the word "Dual" through the window 84 which signifies that the thermostat is conditioned for response to control from the control point. The positions of the lever 82 are determined by a pin-and-slot connection 85. In order to prevent unauthorized persons from rendering the dual control permanently inoperative, it is preferred to actuate the lever 82 by a special key 86 (Fig. 3) which may be inserted through a hole 87 in the casing 53, the casing being locked against unauthorized removal from the base 41.

We claim as our invention:

1. A thermostat for dual control heat regulating systems and the like combining a casing, a thermo-sensitive device within said casing, a relatively stationary device cooperating therewith to form a control mechanism, a permanent magnet operatively connected with one of said devices and movable to vary the relation of the device for the maintenance of a different temperature, a magnetic member positioned to be engaged by said magnet when the thermostat is set for response to the temperature to be maintained during the night, the magnetic attraction between said magnet and said member serving to maintain such setting, and manually operable means operatively connected to said magnet and projecting through said casing to permit shifting of the magnet out of engagement with said member whereby to increase the temperature to which said thermostat is adapted to respond.

2. A control device for dual control heat regulating systems combining thermo-responsive control means adapted to be set for the maintenance of a high day temperature or a low night temperature, a pair of magnetic members one of which is permanently magnetized, said members cooperating by magnetic attraction to retain the night setting of said control means, a casing enclosing said control means and said members, and means operable from the exterior of said casing to separate said members whereby to restore the day setting of said control means.

3. A control device for dual control heat regulating systems combining thermo-responsive control means adapted to be set for the maintenance of a high day temperature or a low night temperature, a pair of magnetic members one of which is permanently magnetized, said members cooperating by magnetic attraction to retain the night setting of said control means, a casing enclosing said control means and said members, and means by which the attractive action between said members may be rendered ineffectual thereby restoring the day setting of said control means, said last mentioned means permitting operation of one of said members from a point exteriorly of said casing.

4. A control device for dual control heat regulating systems combining thermo-responsive control means adapted to be set for the maintenance of a high day temperature or a low night temperature, a movable member for changing the setting of said control means, a relatively stationary member for limiting the movement of said member in a direction to decrease the temperature to which said control means is adapted to respond, one of said members being permanently magnetized and operable to maintain the night setting of said control means, electromagnetic means energizable from a remote point of control to move said first mentioned member from day to night position or vice versa, and a manually operable device by which said member may be shifted from night to day position.

5. A control device for dual control heat regulating systems combining thermo-responsive control means adapted to be set for the maintenance of a high day temperature or a low night temperature, a pair of magnetic members one of which is permanently magnetized, said members cooperating by magnetic attraction to retain the night setting of said control means, a casing enclosing said control means and said members, and key-controlled means for locking the movable member against movement into night position.

6. A thermostat for dual control heat regulating systems and the like combining a casing, a thermo-sensitive device within said casing, a relatively stationary device cooperating therewith to form a control mechanism, a permanent magnet operatively connected with one of said devices and movable to vary the relation of the device for the maintenance of a different temperature, a magnetic member positioned to be engaged by said magnet when the thermostat is set for response to the temperature to be maintained during the night, the magnetic attraction between said magnet and said member serving to maintain such setting, manually operable means operatively connected to said magnet for shifting the magnet out of engagement with said member whereby to increase the temperature to which said thermostat is adapted to respond, and means associated with said last mentioned means for indicating the setting of the thermostat.

7. A control device for dual control heat regulating systems combining thermo-responsive control means adapted to be set for the maintenance of a high day temperature or a low night temperature, a movable member for changing the setting of said control means, a relatively stationary member for limiting the movement of said member in a direction to decrease the temperature to which said control means is adapted to respond, one of said members being permanently magnetized and operable to maintain the night setting of said control means, electromagnetic means energizable from a central point of control to move said first mentioned member from day to night position or vice versa, a manually operable device by which said member may be shifted from night to day position, and means by which said movable member may be locked against movement by said manually operable device.

8. A thermostat for dual control heat-regulating systems combining a thermo-sensitive means, a device cooperating therewith to form a control mechanism, and means for varying the relation of said means and said device to change the setting of the thermostat for response to a different temperature comprising, a pair of electromagnetic coils arranged in end-to-end relation, a U-shaped magnetic member with its intermediate portion extending along said coils adjacent thereto, the ends of said member projecting into the remote ends of said coils and constituting magnetic poles, a magnetic bar having its opposite ends enclosed by said coils, said bar being mounted for endwise reciprocation between said poles.

9. A thermostat for dual control heat-regulating systems and the like having a member movable between either of two positions to change the setting of the thermostat for the maintenance of a low night temperature or a high day temperature, and power-operated means for actuating said member comprising a pair of spaced magnetic pole pieces, a bar permanently magnetized to form end poles of opposite polarity and mounted for reciprocation into endwise engagement with one or the other of said pole pieces, and an electromagnetic winding adapted when energized to constitute both of said pole pieces of like polarity whereby to produce repulsion between one of said pole pieces and said bar, and attraction between the other pole piece and said bar.

10. A thermostat for dual control heat-regulating systems and the like having a member movable between either of two positions to change the setting of the thermostat for the maintanance of a low night temperature or a high day temperature, and power-operated means for actuating said member comprising a pair of spaced magnetic pole pieces, a bar permanently magnetized to form end poles of opposite polarity and mounted for reciprocation into endwise engagement with one or the other of said pole pieces, and a pair of electromagnetic coils each enclosing one of said pole pieces and one end of said bar and adapted when energized to produce a solenoidal action on said bar, a repelling action between one of said pole pieces and said bar and an attractive action between said other pole piece and said bar, all of such actions tending to move said bar in the same direction.

11. In a dual control heat-regulating system having a plurality of individual room thermostats, means to change the setting of each thermostat for response to a different temperature, said means comprising, in combination, a magnetized bar mounted for endwise reciprocation into either of two positions, a pair of members composed of magnetic material each positioned for engagement with said bar when the latter is in one of said positions, said bar acting by magnetic attraction of the member engaged thereby to maintain the setting of the thermostat, and electromagnetic means governed from a central point of control and operable to move the bars of a plurality of the thermostats from one of said positions to the other.

12. In a dual control heat-regulating system having a plurality of individual room thermostats, means to change the setting of each thermostat for response to a different temperature, said means comprising, in combination, a magnetized bar mounted for endwise reciprocation into either of two positions, a pair of members composed of magnetic material each positioned for engagement with said bar when the latter is in one of said positions, said bar acting by magnetic attraction of the member engaged thereby to maintain the setting of the thermostat, and means composed of magnetic material providing a substantially closed magnetic connection between the intermediate portion of said bar and each of said members.

13. A thermostat for dual control heat-regulating systems combining a thermo-sensitive means, a device cooperating therewith to form a control mechanism, and means for varying the relation of said means and said device to change the setting of the thermostat for response to a different temperature comprising, a pair of electromagnetic coils arranged in end-to-end relation, a U-shaped magnetic member having a substantially straight intermediate portion extending along said coils adjacent thereto, the ends of said member projecting into the remote ends of said coils, a magnetic bar having its opposite ends enclosed by said coils, said bar being mounted for endwise reciprocation between the ends of said member, and means providing a magnetic shunt between said member and the intermediate portion of said bar whereby to form a substantially closed magnetic circuit through said bar and the end of said member engaged thereby.

14. A thermostat for dual control heat-regulating systems and the like combining thermo-responsive control means, a permanent magnet mounted for movement into either of two positions, a pair of stationary members composed of magnetic material, each positioned to be engaged by and attracted to said magnet when the latter is in one of said positions, means composed of magnetic material and providing a substantially closed magnetic circuit extending through part of said magnet and the member engaged thereby when the magnet is in either of said positions, whereby to increase the attractive force of the magnet, and means actuated by movement of said magnet to vary the temperature to which said control means is adapted to respond.

15. A thermostat for dual control heat regulating systems and the like having a member movable between either of two positions to change the setting of the thermostat for the maintenance of a low night temperature or a high day temperature, and power operated means for actuating said member comprising a pair of spaced magnetic pole pieces, a bar permanently magnetized to form end poles of opposite polarity and mounted for reciprocation into endwise engagement with one or the other of said pole pieces, and means composed of magnetic material and extending from the intermediate portion of said bar to each of said pole pieces whereby to decrease the reluctance of the two magnetic circuits through opposite ends of said bar and the coacting pole pieces.

16. An electromagnetic actuator for changing the setting of a thermostat having a relatively stationary member composed of magnetic material, a permanent magnet mounted for movement into and out of contact with said member and adapted when contacting said member to attract the same and thereby retain the setting of the thermostat, means composed of magnetic material interposed between said member and said magnet and providing a substantially closed metallic flux circuit through said magnet and member when the magnet is in engagement with the member, and electromagnetic means adapted when energized to effect relative movement between said member and said magnet.

In testimony whereof we have hereunto affixed our signatures.

DUNCAN J. STEWART.
PRESTON W. CUMMINGS.